Patented Oct. 9, 1928.

1,686,947

UNITED STATES PATENT OFFICE.

MELCHIOR BOENIGER, OF BASEL, SWITZERLAND, ASSIGNOR TO CHEMICAL WORKS FORMERLY SANDOZ, OF BASEL, SWITZERLAND.

DIAZOTIZABLE AZODYESTUFFS.

No Drawing. Application filed October 15, 1925, Serial No. 62,659, and in Germany March 28, 1925.

It is known by numerous patent specifications that diazotizable azo-dyestuffs can be obtained by using meta-aminophenylmethylpyrazolone and meta-aminophenylpyrazolone-carboxylic acid as components. Representatives of this class of dyestuffs are claimed in the Swiss Patents Nos. 54,418 to 54,425 inclusive as being obtained from one molecule of the tetrazocompound of a paradiamine with one molecule of an aryl-orthohydroxycarboxylic acid and one molecule of a meta-aminophenylpyrazolone. These dyestuffs have, however, not found a general use on account of their insufficient solubility.

I have found that by using, as components, sulphoaminoarylpyrazolones, easily soluble azo-dyestuffs may be produced, which give full satisfaction with regard to penetration and uniformity whether dyed in barges or in apparatus.

The best results are obtained by using the new pyrazolone derivatives which are formed by condensation of the 6-nitro-2-tolylhydrazine-4-sulphonic acid with ethylaceto-acetate or ethyloxalo-acetate and subsequent reduction, corresponding to the general formula

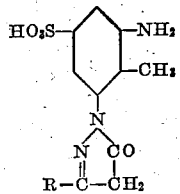

where R stands for $CH_3$ or COOH.

Whereas the symmetric disazo dyestuffs from a paradiamine and two molecules of these 2'-methyl-3'-amino-5'-sulpho-1-phenyl-5-pyrazolones have no technical value, it has been found that valuable substantive dyestuffs can be obtained by coupling the intermediate products of one molecule of a tetrazodiaryl and one molecule of an aryl-orthohydroxycarboxylic acid with one molecule of a 2'-methyl-3'-amino-5'-sulpho-1-phenyl-5-pyrazolone or by coupling the intermediate product of one molecule tetrazodiaryl and one molecule of a 2'-methyl-3'-amino-5'-sulpho-1-phenyl-5-pyrazolone with one molecule of an azocomponent as for instance an amine, phenol, pyrazolone, naphthol, aminophenolester, aminonaphtholester, aryl-orthohydroxycarboxylic acid, aminophenolsulphonic acid, naphthylaminesulphonic acid, aminonaphtholsulphonic acid, aminophenyl-1.2-naphthimidazol-5-hydroxy-7-sulphonic acid, aminobenzoyl-2-amino-5-naphthol-7-sulphonic acid, the monoazodyestuffs corresponding to the formula

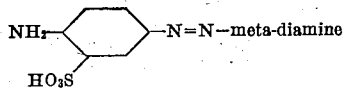

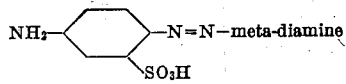

The dyestuffs thus obtained, when diazotized on the fibre, can be developed with unsulphonated azocomponents, for instance beta-naphthol, meta-diamines, phenylmethylpyrazolone, to shades varying from orange to red and dark brown, which are fast to washing and can be discharged with rongalite to pure white effects. Furthermore, the direct dyeings can also be made fast to washing by a subsequent treatment with paranitrodiazobenzene or formaldehyde. The new diazotizable azo-dyestuffs constitute in a dry state, brick red to brown black powders easily soluble in water with orange to violet brown colour and dissolving in concentrated sulphuric acid with red violet to black violet colorations. Their ammoniacal watery solution boiled with zinc dust is decolorized, the solution becoming in contact with the air rapidly violet.

The same diazotizable azo-dyestuffs can be obtained by substituting in the above mentioned process the 2'-methyl-3'-amino-5'-sulpho-1-phenyl-5-pyrazolones by the corresponding 2'-methyl-3'-nitro-5'-sulpho-1-phenyl-5-pyrazolones and by reducing in the thus formed nitrodyestuffs the nitro group to the amino group by a suitable treatment with sodium sulphide.

The following examples illustrate the invention, the parts being by weight:

*Example 1.*

18,4 parts of benzidine are diazotized and combined with 15,5 parts of ortho-cresotinic acid to the intermediate product. As soon as free tetrazodiphenyl can no more be traced, the soda alkaline solution of 28,3 parts of 2'-methyl-3'-amino-5'-sulpho-1-phenyl-3-methyl-5-pyrazolone is added. In the course of some hours' stirring the brownish yellow intermediate product is transformed into the diazo-dyestuff forming a bright orange precipitate. Heated up to 50° C. it goes completely in solution and can be precipitated by addition of common salt in form of a bright orange resin, which solidifies on cooling down and can easily be filtered off. It constitutes in a dry state a brick red powder, dissolves in water with orange and in concentrated sulphuric acid with red violet colour. Its ammoniacal watery solution boiled with zinc dust is decolorized, the solution becoming, in contact with the air, rapidly violet. It dyes unmordanted cotton bright yellow orange shades; diazotized on the fibre it can be developed with metatoluylendiamine to slightly more brown orange shades, whereas in developing with betanaphthol bright reddish orange shades, fast to washing, are obtained.

The dyestuff obtained according to this example has most probably the following formula:

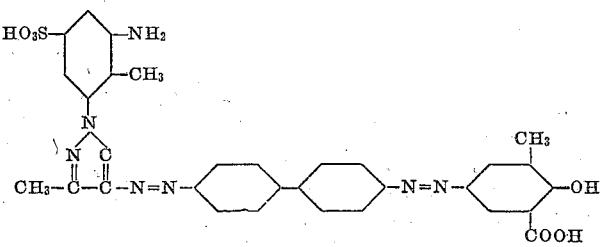

Example 2.

24,4 parts of dianisidine are diazotized and combined with 14,5 parts of salicylic acid in soda alkaline solution to the intermediate product. By addition of a slightly alkaline solution of the trisodium salt of 31,3 parts of 2'-methyl-3'-amino-5'-sulpho-1-phenyl-5-pyrazolone-3-carboxylic acid the dark brown precipitate of the intermediate product turns to red brown. After 12 hours' stirring at 20° C., the formation of the disazo dyestuff is finished. It can be filtered off and dried. It constitutes a red brown powder and dissolves in water with red brown colour. This solution, boiled with zinc dust in presence of ammonia, is decolorized, oxidizing, however, rapidly in contact with the air with violet coloration.

The new azo-dyestuff dissolves in strong sulphuric acid with violet coloration.

The dyestuff obtained according to this example has most probably the following formula:

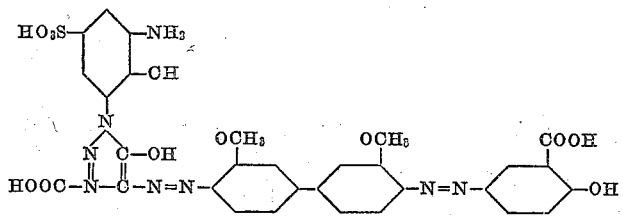

Example 3.

To the tetrazo solution, corresponding to 21,2 parts of tolidine, cooled down to 5° C. pour within about 15 minutes the neutral solution of the trisodium salt of 34,3 parts of 2'-methyl-3'-nitro-5'-sulpho-1-phenyl-5-pyrazolone-3-carboxylic acid, while agitating well all the time. A brick red intermediate product is formed, which remains partly in solution. As soon as an acidified test shows no more uncoupled tetrazoditolyl, add the concentrated solution of 20 parts of sodium carbonate and afterwards a slightly alkaline solution of 23,9 parts of 2-amino-8-hydroxy-naphthalene-6-sulphonic acid. A dark violet solution is obtained, from which, after 12 hours' stirring at 20° C. the nitrodisazo dyestuff can be salted out after neutralization with muriatic acid.

For the reduction of the nitro group, however, the coupling solution is used directly. 60 parts of crystallized sodium sulphide are added and the temperature is raised to 50° C. and maintained thereon during 12-15 hours until the reaction of sodium sulphide has disappeared. Then, the solution is neutralized with hydrochloric acid and the aminopyrazolone disazo dyestuff thus formed precipitated with common salt.

When dried it is a brown black powder, soluble in water with a violet brown and in concentrated sulphuric acid with a blue violet coloration. When boiled with zinc dust in presence of ammonia the watery solution is decolorized. This solution oxidizes in contact with the air with violet coloration. It dyes unmordanted cotton violet brown shades like the corresponding nitro dyestuff, the shades of which are slightly more yellowish in tone. In the diazotized and developed dyeing, the nitro dyestuff turns to a dark violet blue, whereas the amino dyestuff shows no material change in tone, acquires however an excellent fastness to washing.

The dyestuff obtained according to this example has most probably the following formula:

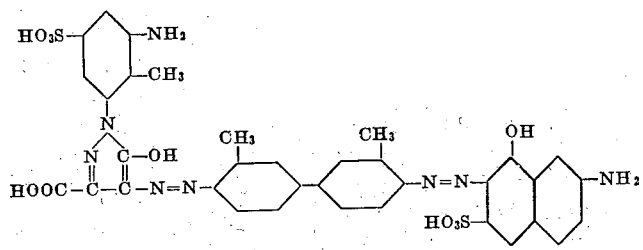

Example 4.

Diazotize 18,4 parts of benzidine and add to the solution thereby obtained and cooled down to 5° C., the neutral solution of the trisodium salt corresponding to 31,3 parts of 2'-methyl-3'-amino-5'-sulpho-5-pyrazolone-3-carboxylic acid. As soon as the formation of the orange coloured intermediate product is finished, add the concentrated solution of 20 parts of sodium carbonate and then introduce thereinto a solution of the monoazo dye obtained by coupling the diazo compound of 18,8 parts of paraphenylendiaminsulphonic acid and 12,3 parts of metatoluylendiamine, preliminarily rendered alkaline with sodium carbonate. The intermediate product is very rapidly formed giving a deep brown solution. The trisazo colour thus formed can be precipitated by neutralizing the sodium carbonate of the solution and by adding common salt. When dried it constitutes a brown black powder, dissolving in water with brown, in concentrated sulphuric acid with violet coloration. Its ammoniacal watery solution, when boiled with zinc dust, is decolorized, the solution becoming in contact with the air rapidly violet. It produces, on unmordanted cotton, bright red brown shades, which are scarcely changed in tone by diazotizing and developing with beta-naphthol, but which become very fast to washing by such subsequent treatment.

The dyestuff obtained according to this example has most probably the following formula:

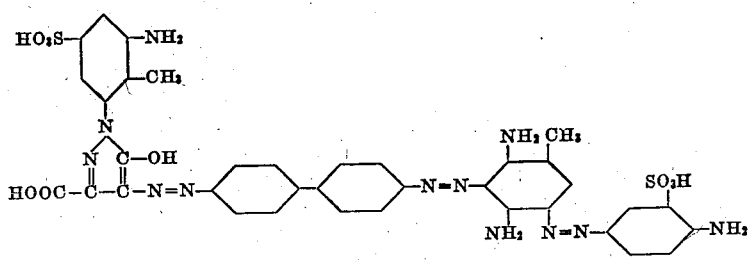

What I claim is:

1. The herein described unsymmetrical azodyestuffs deriving from one molecule of a tetrazodiaryl, one molecule of a 2'-methyl-3'-amino-5'-sulpho-1-phenyl-5-pyrazolone of the general formula

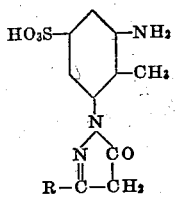

where R stands for CH$_3$ or COOH, and one molecule of an azo component, the herein mentioned pyrazolone derivatives excluded dyeing unmordanted cotton in shades varying from orange to red and dark brown, which, diazotized on the fibre, can be developed to similar shades fast to washing, constituting in form of their sodium salts brick red to brown black powders, easily soluble in water with orange to violet brown colour, dissolving in concentrated sulphuric acid with red violet to black violet colorations, their ammoniacal watery solution boiled with zinc dust being decolorized, this solution becoming in contact with the air rapidly violet.

2. The herein described unsymmetrical azodyestuffs deriving from one molecule of a tetrazodiaryl, one molecule of 2'-methyl-3'-amino-5'-sulpho-1-phenyl-5-pyrazolone-3-carboxylic acid and one molecule of an azo-component, the herein mentioned pyrazolene derivatives excluded, dyeing unmordanted cotton in shades varying from orange to red and dark brown, which, diazotized on the fibre, can be developed to similar shades fast to washing, constituting in form of their sodium salts brick red to brown black powders, easily soluble in water with orange to violet brown colour, dissolving in concentrated sulphuric acid with red violet to black violet colorations, their ammoniacal watery solution, boiled with zinc dust, being decolorized, this solution becoming in contact with the air rapidly violet.

3. The herein described new diazotizable azo-dyestuffs derivable from one molecule of a tetrazodiaryl, one molecule of an aryl-ortho-hydroxycarboxylic acid and one molecule of a 2'-methyl-3'-amino-5'-sulpho-1-phenyl-5-pyrazolone of the general formula

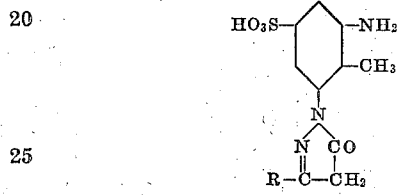

where R stands for $CH_3$ or $COOH$, dyeing unmordanted cotton in orange to red shades, which, diazotized on the fibre, can be developed to similar shades fast to washing, constituting in form of their sodium salts brick red to brown red powders, easily soluble in water with orange to red colour, dissolving in concentrated sulphuric acid with red violet colorations, their ammoniacal watery solution, boiled with zinc dust, being decolorized, this solution becoming in contact with the air rapidly violet.

4. The herein described new diazotizable azodyestuffs deriving from one molecule of a tetrazodiaryl, one molecule of an aryl-ortho-hydroxycarboxylic acid and one molecule of 2'-methyl-3'-amino-5'-sulpho-1-phenyl-5-pyrazolone-3-carboxylic acid, dyeing unmordanted cotton in orange to red shades, which, diazotized on the fibre, can be developed to similar shades fast to washing, constituting in form of their sodium salts brick red to brown red powders, easily soluble in water with orange to red colour, dissolving in concentrated sulphuric acid with red violet colorations, their ammoniacal watery solution, boiled with zinc dust, being decolorized, this solution becoming, in contact with the air, rapidly violet.

In witness whereof I have hereunto signed my name this 2nd day of October, 1925.

MELCHIOR BOENIGER.